R. L. MORGAN.
LOADING AND UNLOADING DEVICE.
APPLICATION FILED JAN. 20, 1913.
1,175,545.
Patented Mar. 14, 1916.
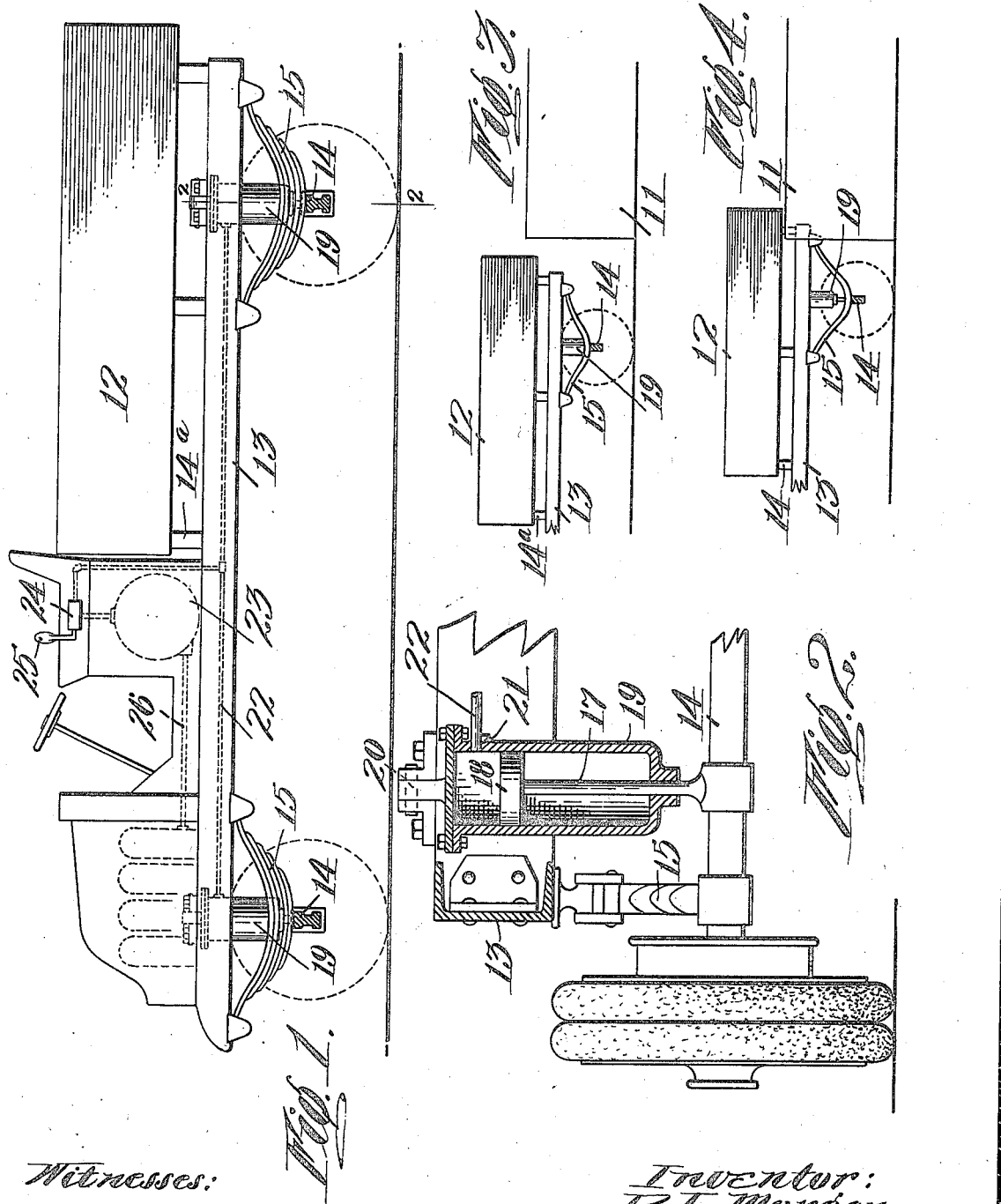
Witnesses:
Inventor:
R. L. Morgan.
by attorneys
Southgate & Southgate.

UNITED STATES PATENT OFFICE.

RALPH L. MORGAN, OF WORCESTER, MASSACHUSETTS.

LOADING AND UNLOADING DEVICE.

1,175,545.  Specification of Letters Patent.  Patented Mar. 14, 1916.

Application filed January 20, 1913. Serial No. 742,998.

*To all whom it may concern:*

Be it known that I, RALPH L. MORGAN, a citizen of the United States, residing at Worcester, in the county of Worcester and State of Massachusetts, have invented a new and useful Loading and Unloading Device, of which the following is a specification.

This invention relates to that type of motor trucks in which a false body is carried on the truck and operated to facilitate loading and unloading by depositing the false body on a slip and receiving it therefrom. In my Patents Nos. 800,168 and 982,972 granted respectively on the 26th day of September, 1905 and the 31st day of January, 1911, certain arrangements are disclosed for accomplishing this general result.

The principal objects of the present invention are to provide an improvement whereby the use of any mechanism outside the truck itself will be avoided and whereby the operation of raising and lowering the false body may be positive and exact and the height of the false body will not in any way be dependent upon the springs.

The invention also involves improvements in details of construction and combinations of parts as will appear hereinafter.

Reference is to be had to the accompanying drawings in which,

Figure 1 is a side elevation of an automobile truck constructed in accordance with this invention, Fig. 2 is a sectional view of the same on an enlarged scale on the line 2—2 of Fig. 1, and Figs. 3 and 4 are two diagrammatic side views showing the manner of manipulating the device for the purpose of backing into a slip to deposit the false body thereon.

As in the case of my other patents above mentioned, the invention is intended to be used with a slip or fixed platform 11 into or along which the main body 13 of the automobile is adapted to back. On the platform 13 of the truck is a false body 12 for supporting and carrying the load, this body being shown as supported by the ledge 14ª so as to be spaced at a fixed distance from the platform 13.

The platform 13 of the vehicle is supported in the usual way from the axle 14 by springs 15. Pivotally connected with the axles are piston rods 17, preferably four in number, each having a fixed piston 18 thereon. Each of these pistons is provided with a cylinder 19 fixed at the top of the bottom of the platform or body 13 of the vehicle and shown as pivotally connected therewith at 20. Each cylinder is provided with an inlet 21 adapted to receive compressed air or gas through a pipe 22 from any desired point, preferably from an air tank 23 located under the seat or in any other convenient position, and provided with a valve controlling connection at 24 controlled by a lever 25. This air tank can be filled from an air pump or as shown in the drawings, from one of the motor cylinders through a pipe 26. The details of this mechanism are not illustrated, as any suitable piping and valve controlling arrangement can be employed.

It is to be observed that the pistons are solidly connected by means of their piston rods with the rigid axles of the vehicle so that when air is let into the cylinders, the truck body itself will be lifted positively and the resistance of the springs will not affect the vertical position of the false body when lifted in this way.

In operation when the automobile truck is to be backed into the slip, air is let into the cylinders, thus lifting not only the false body but the entire body of the truck from the axles. This carries the false body which supports the load above the slip so that the truck can be backed into it, as shown in Fig. 4. When backed into position in the slip the air is let out of the cylinders by manipulation of the lever 25 and the body of the vehicle drops leaving the false body on the slip, it being understood, of course, that the slip is so shaped and arranged as to receive the main body 13 or platform of the vehicle under it and the false body 12 over it, as indicated in my above mentioned patents. This having been accomplished, the truck can be run out again, leaving the false body and the load on the slip. To pick up a load the reverse operation takes place.

It will be understood of course that other devices than air cylinders can be used but in any event the lifting mechanism expands the springs 15 and lifts the body or platform of the truck positively from the axles. In this way it will be seen that one difficulty that is encountered with some of the old forms is avoided. This difficulty is due to the fact that after raising the false body from the platform and depositing it on the slip so that the weight thereof is removed from the platform, the springs would expand and raise the platform of the truck up into contact with the false body, thus necessitating the further raising of the false body before it could be separated entirely from the truck. In addition to this the upward force applied to the load comes directly from the solid axles and not from a spring supported truck platform so that the amount of motion which is secured is positive and readily determined. When once the necessary lift has been secured, the supported body is held at that elevation until it is desired to release it. Also, in case of breakage of one of the springs, this mechanism can be used for jacking up the body during the repairs.

It is to be understood that for some purposes only two of the cylinders need be used. For example, they can be used only on the rear axle, leaving the front connections as usual, or pivoting the front end of the platform 13. In this way the rear end of the platform can be raised and lowered for the purposes herein described.

Although I have illustrated and described only one form of the invention, I am aware of the fact that many modifications can be made therein without departing from the scope thereof as expressed in the claims. Therefore, I do not wish to be limited to all the details herein shown and described, but What I do claim is:—

1. In a loading and unloading device for motor trucks, the combination with a truck body or platform, an axle for supporting one end of it, and springs between the axle and platform, and means mounted on said axle and connected with said platform for raising and lowering that end of the platform positively from the axle respectively in opposition to and coöperation with the springs.

2. In a loading and unloading device for motor trucks, the combination with a truck body or platform, an axle for supporting it, and springs between the axle and platform, of a false body rigidly supported on said platform at a fixed distance therefrom, air cylinders connected with said platform, and pistons in the cylinders connected with the axle for simultaneously raising and lowering the platform and false body.

3. In a device of the class described, the combination with a truck comprising a platform, axles, and springs between the axles and platform, of cylinders and pistons connected with the axle and platform for simultaneously expanding the springs and lifting the platform from the axles, one of the connections of the cylinders and pistons to the axle and platform being pivoted.

4. In a loading and unloading device for motor trucks the combination with a truck body or platform, axles for supporting it, and springs between the axles and platform, of a false body supported on said platform, air cylinders pivotally connected with said platform, and pistons in the cylinders solidly connected with the axles for raising and lowering the platform.

In testimony whereof I have hereunto set my hand, in the presence of two subscribing witnesses.

RALPH L. MORGAN.

Witnesses:
ALBERT E. FAY,
MARY E. REGAN.